(No Model.)
H. C. SWAN.
KING BOLT SOCKET FOR VEHICLES.
No. 558,232. Patented Apr. 14, 1896.
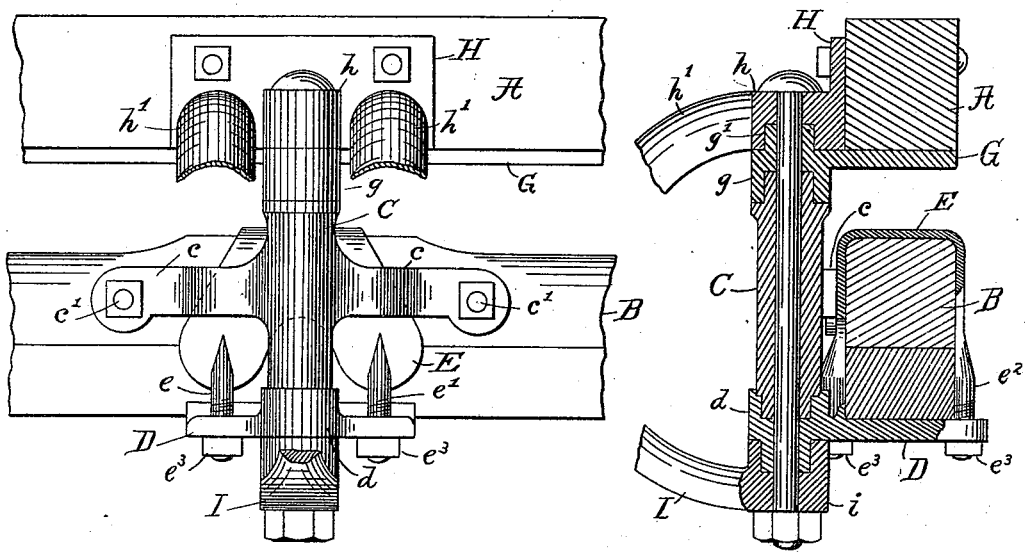
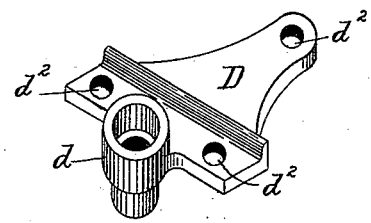
Witnesses.
F. Griswold
Helen M. Hutchison
Inventor.
Henry C. Swan
By his attorney
E. L. Thurston

UNITED STATES PATENT OFFICE.

HENRY C. SWAN, OF OSHKOSH, WISCONSIN.

KING-BOLT SOCKET FOR VEHICLES.

SPECIFICATION forming part of Letters Patent No. 558,232, dated April 14, 1896.

Application filed February 13, 1896. Serial No. 579,166. (No model.)

*To all whom it may concern:*

Be it known that I, HENRY C. SWAN, a citizen of the United States, residing at Oshkosh, in the county of Winnebago and State of Wisconsin, have invented certain new and useful Improvements in King-Bolt Sockets for Vehicles; and I do hereby declare the following to be a full, clear, and exact description of the invention, such as will enable others skilled in the art to which it appertains to make and use the same.

My invention relates to improvements in the construction of king-bolt sockets for vehicles, the object being to form a neat, cheap, and strong device adapted for use in lieu of the old style clip king-bolt.

The invention consists in the construction and combination of parts hereinafter described and claimed.

In the drawings, Figure 1 is a rear elevation of my improved device. Fig. 2 is a vertical sectional side view, and Fig. 3 is a perspective view of the bottom yoke-plate.

Referring to the parts by letter, A represents the head-block, and B the front axle.

C represents a sleeve having formed integral with it laterally-projecting arms $c\,c$, which are slightly curved forward against the axle, to which they are secured by the bolts $c'\,c'$, whereby the sleeve is held a short distance away from the axle.

D represents an approximately triangular yoke-plate, which lies against the bottom of the axle and projects both behind and in front thereof. On its rear broad side, in the middle thereof, is formed a boss $d$, in the upper side of which is formed a cylindrical recess into which the lower cylindrical end of the sleeve C projects.

E represents a clip, which embraces the top and both sides of the axle in front of the sleeve C and between the legs $c\,c$. Its rear end is bifurcated, and three threaded shanks $e\,e'\,e^2$ are formed on the two bifurcated ends and on the front end of said clip, and these shanks pass through holes $d^2$ in the yoke-plate, where they are secured, and the yoke-plate is held in place by the nuts $e^3$.

Plates G and H are secured to the head-block, and are provided with rearwardly-projecting lugs $g$ and $h$, respectively, which form the upper fixed member of the king-bolt socket. Obviously only one lug and plate need be used; but I prefer to employ two, as shown, and I also prefer to have the said lugs interlock by means of a recess $g'$ in one which receives the end of the other.

I represents a brace of the ordinary form, which is provided on its front end with a boss $i$, which forms the lower fixed member of the king-bolt socket.

Two arms $h'\,h'$, formed on the plate H, extend rearward, and they and the rear end of the brace I are secured to the reach.

The king-bolt passes through the several parts of the king-bolt socket and holds them in the described relation with each other.

Having described my invention, I claim—

1. The combination of the axle and a sleeve having legs which are secured to the rear side of said axle, with a yoke-plate lying against the bottom of the axle and projecting on both sides thereof and having a boss on its rear side, and a clip which embraces the top and front and rear sides of the axle between said lateral legs, and has shanks which pass through holes in the yoke-plate, and nuts which screw onto said shanks, substantially as and for the purpose specified.

2. The combination of the axle, with the movable member of the king-bolt socket, consisting of a sleeve having two lateral legs which are bolted to the rear side of the axle, a yoke-plate lying against the bottom of the axle and projecting on both sides thereof and having a boss on its rear end which interlocks with said sleeve, and a clip which embraces the top, back and front of the axle between said lateral legs, and has three threaded shanks which pass through holes in the yoke-plate, substantially as and for the purpose specified.

In testimony whereof I affix my signature in presence of two witnesses.

HENRY C. SWAN.

Witnesses:
E. L. THURSTON,
L. F. GRISWOLD.